United States Patent
Grover (10) Patent No.: US 11,627,368 B1
(45) Date of Patent: Apr. 11, 2023

(54) AUTOMATIC OFFERING AND SWITCHING TO A HIGHER QUALITY MEDIA STREAM

(71) Applicant: Roku, Inc., San Jose, CA (US)

(72) Inventor: Matthew Grover, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/696,607

(22) Filed: Mar. 16, 2022

(51) Int. Cl.
*H04N 21/44* (2011.01)
*H04L 65/80* (2022.01)
*H04N 21/472* (2011.01)

(52) U.S. Cl.
CPC ....... *H04N 21/44016* (2013.01); *H04L 65/80* (2013.01); *H04N 21/44008* (2013.01); *H04N 21/47202* (2013.01)

(58) Field of Classification Search
CPC ....... H04N 21/44016; H04N 21/44008; H04N 21/47202; H04N 21/472; H04L 65/80
See application file for complete search history.

(56) References Cited

U.S. PATENT DOCUMENTS

| | | | |
|---|---|---|---|
| 2009/0228942 A1* | 9/2009 | Brelivet | H04N 7/173 |
| 2014/0282658 A1* | 9/2014 | Sinha | H04N 21/442 |
| 2014/0282662 A1* | 9/2014 | Major | H04N 21/24 |
| 2019/0246158 A1* | 8/2019 | Martell | H04N 21/26233 |
| 2022/0256232 A1* | 8/2022 | Pesin | H04N 21/4383 |

\* cited by examiner

*Primary Examiner* — Anthony Bantamoi
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for automatically offering and switching to outputting to a higher quality media stream in place of a lower quality media stream. An example embodiment operates by performing automated content recognition (ACR) on a first media stream thereby determining a first content item having a first quality level in the first media stream. The embodiment determines that the first content item matches a second content item having a second quality level in a second media stream at a content source, wherein the second quality level is higher than the first quality level. The embodiment requests the second media stream from the content source. The embodiment receives the second media stream from the content source. The embodiment then outputs the second media stream in place of the first media stream.

20 Claims, 4 Drawing Sheets

AUTOMATIC OFFERING AND SWITCHING TO A HIGHER QUALITY MEDIA STREAM

BACKGROUND

Field

This disclosure is generally directed to automatically offering and switching to a higher quality media stream from a lower quality media stream, and more particularly to automatically offering and switching to a higher quality media stream from a lower quality media stream with seamless frame transition.

Background

A user often uses a set-top box (STB) or over-the-air (OTA) device to watch or listen to content on their television or other output device. However, content delivered this way may not make full use of the capabilities of the television or other output device. For example, the content may be delivered as standard definition (SD) content despite the fact that the television or other output device supports displaying high definition (HD) content or ultra-high definition (UHD) content. This may reduce the user's viewing experience. This may also make the user less likely to purchase a high-resolution television or display device in the future. Thus, there is a need to automatically offer and switch to a higher quality media stream of the same content where possible.

However, to date, efforts to automatically offer and switch to a higher quality media stream have been limited. For example, approaches to automatically offering and switching to a higher quality media stream may involve detecting the underlying television channel being output based on channel information received from a STB or OTA device. However, a media device is often unable to receive such channel information from a STB or OTA device. In addition, approaches to automatically offering and switching to a higher quality media stream are often unable to seamlessly switch from the lower quality media stream to the higher quality media stream. For example, these approaches often cannot synchronize the frame transition from a lower quality frame to a higher quality frame.

SUMMARY

Provided herein are system, apparatus, article of manufacture, method and/or computer program product embodiments, and/or combinations and sub-combinations thereof, for automatically offering and switching to a higher quality media stream from a lower quality media stream. Existing approaches to automatically offering and switching to a higher quality media stream may involve detecting the underlying television channel being output based on channel information received from a set-top box (STB) or over-the-air (OTA) device. For example, a media device may receive the channel information from a STB via High-Definition Multimedia Interface (HDMI) Consumer Electronics Control (CEC) or another mechanism. However, a media device is often unable to receive such channel information from a STB or OTA device. Moreover, there is a need for a media device to be able to automatically offer and switch to a higher quality media stream in place of a lower quality media stream that is not received through the STB or OTA device (e.g., an Internet or over-the-top (OTT) stream). In other words, existing approaches to offering and switching to a higher quality media stream are often limited to the case where the lower quality media stream is received from a STB or OTA device, and the STB or OTA device is able to transmit channel information to the media device.

In addition to the above, existing approaches for automatically offering and switching to a higher quality media stream are often unable to switch seamlessly from the lower quality media stream to the higher quality media stream. For example, existing approaches are often unable to synchronize the transition from a lower quality frame to a higher quality frame of the same content.

In contrast to existing approaches, embodiments described herein solve these technological problems by having the media device perform automated content recognition (ACR) on the lower quality media stream to determine a content item in the lower quality media stream and optionally a time point where the content item occurs in the lower quality media stream. After the determining the content item, the media device can automatically replace the lower quality media stream with a higher quality media stream having the same content item. Moreover, the media device can perform the replacement such that there is a seamless frame transition from the lower quality media stream to the higher quality media stream.

An example embodiment operates by performing ACR on a first media stream thereby determining a first content item having a first quality level in the first media stream. The embodiment then determines that the first content item matches a second content item having a second quality level in a second media stream at a content source, where the second quality level is higher than the first quality level. The embodiment then requests the second media stream from the content source. The embodiment then receives the second media stream from the content source. The embodiment then outputs the second media stream in place of the first media stream. In this case, the embodiment automatically offers and provides a user a higher quality media stream in place of a lower quality media stream. Moreover, the embodiment seamlessly transitions from a lower quality frame of the lower quality media stream to the immediate next frame of higher quality from the higher quality media stream

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automatically offering and switching to a higher quality media stream from a lower quality media stream.

Figure 1:
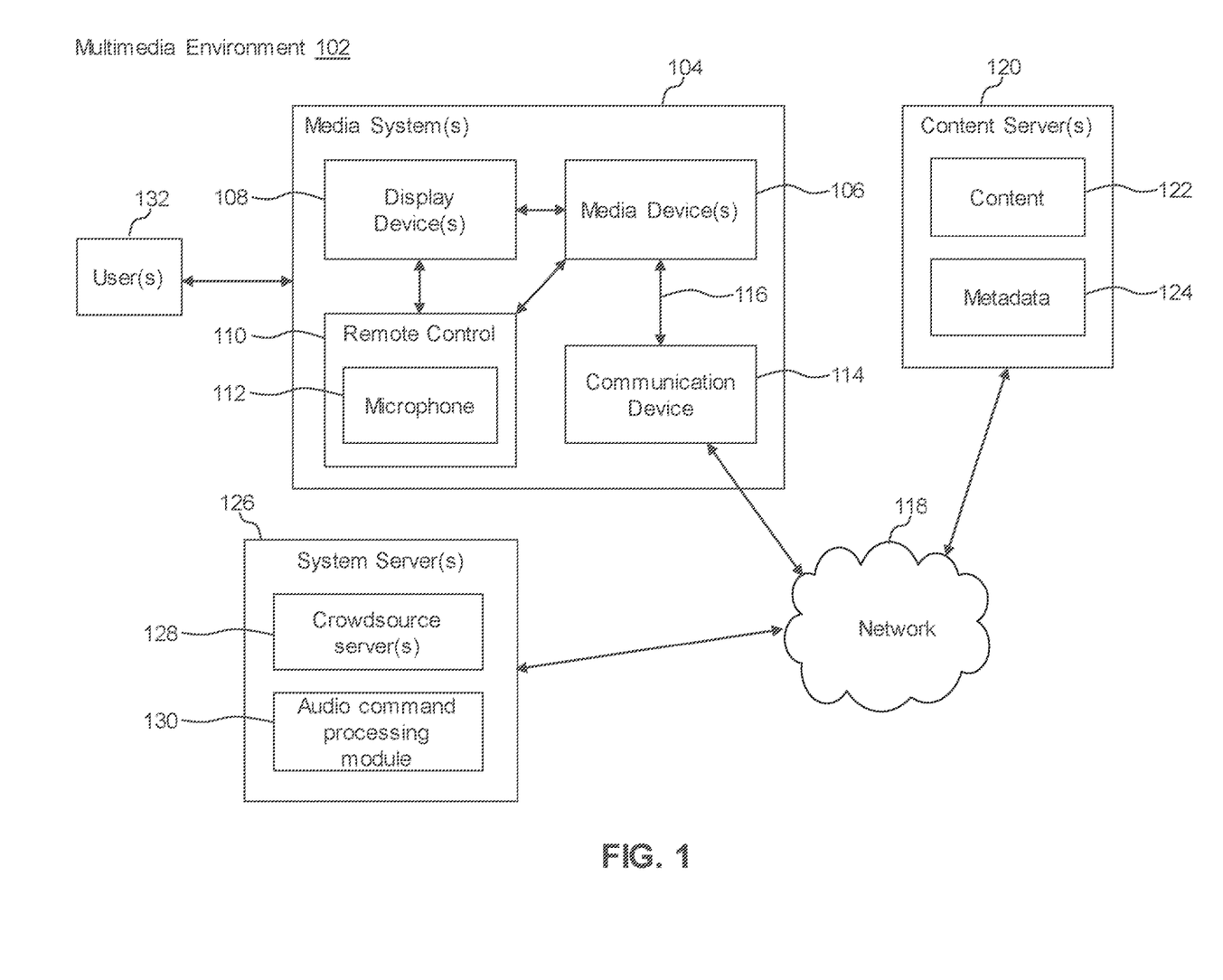
FIG. 1 illustrates a block diagram of a multimedia environment, according to some embodiments.

Various embodiments of this disclosure may be implemented using and/or may be part of a multimedia environment 102 shown in FIG. 1, in some embodiments. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content sources 120 (also called content providers, channels or sources 120). Although only one content server 120 is shown in FIG. 1, in practice the multimedia environment 102 may include any number of content sources 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
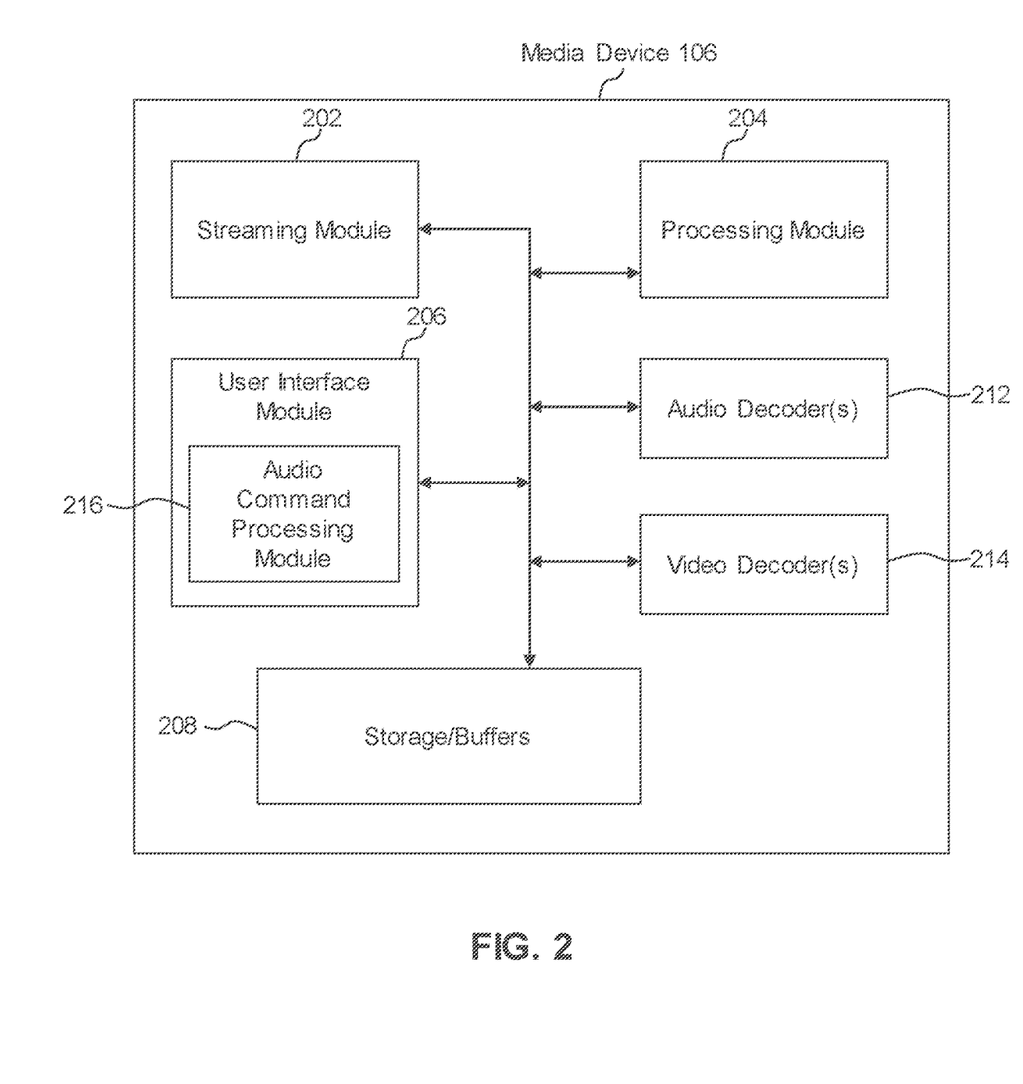
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Automatic Offering and Switching to a Higher Quality Media Stream

Referring to FIG. 1, media device 106 may have access to numerous content sources 120. Accordingly, media device 106 may utilize different content sources 120 to provide the best viewing or listening experience to a user 132. In some embodiments, media device 106 operates to cause the automatic offering and switching to a higher quality media stream (e.g., a higher resolution stream, an advertisement free stream, an uncensored stream, etc.) from a content source 120 in place of a lower quality media stream (e.g., a lower resolution stream, an advertisement supported stream, a censored stream, etc.) having the same content but from a different source (e.g., an OTA broadcast or from another content source 120).

For example, media device 106 may receive a media stream and perform automated content recognition (ACR) on the media stream to determine or identify a content item having a low quality level in the media stream. Media device 106 may also determine a time point where the content item occurs in the media stream. Media device 106 may then determine whether the content item matches the same content item having a higher quality level in another media stream at a content source 120.

For example, media device 106 may transmit the identified content item and the time point to system server 126 via network 118. Based on this information, system server 126 may determine that the content item matches the same content item having a higher quality level in another media stream from a content source 120. System server 126 may then transmit an indication to media device 106 that the identified content item matches the same content item having a higher quality level in another media stream from a content source 120.

Media device 106 may also transmit the identified content item and the time point to a content source 120 via network 118. Based on this information, the content source 120 may determine that the content item matches the same content item having a higher quality level in another media stream from the content source 120. The content source 120 may then transmit an indication to media device 106 that the identified content item matches the same content item having a higher quality level in another media stream from the content source 120.

In response to determining that the identified content item matched the same content item with a higher quality level in another media stream from a content source 120, media device 106 may request and receive the same content item having the higher quality level in the other media stream. Media device 106 may then output the content item having the higher quality level in place of the content item having the lower quality level. Media device 106 may further output the content item having the higher quality level such that there is a seamless frame transition from the lower quality media stream to the higher quality media stream. Accordingly, media device 106 may operate to cause the automatic offering and switching to higher quality media stream from a content source 120 in place of a lower quality media stream from a different source.

Media device 106 may output a media stream to display device 108. Media device 106 may also output a media stream to a speaker. Media device 106 may also output a media stream to various other output devices as would be appreciated by a person of ordinary skill in the art.

Media device 106 may receive a media stream from a STB or OTA box. Media device 106 may also receive a media stream from a content source 120 via network 118.

The received media stream may have a low quality level (e.g., a low resolution). For example, the media stream may be standard definition (SD) content. However, a user 132 of media device 106 may prefer to view an equivalent higher quality media stream (if available) instead of the lower quality media stream. For example, the user 132 may want media device 106 to offer the option to switch to the higher quality media stream when they are viewing the lower quality media stream. The user 132 may also want media device 106 to seamlessly transition from a lower quality frame of the lower quality media stream to a higher quality frame of the higher quality media stream.

To accomplish this, media device 106 may perform ACR on the lower quality media stream (e.g., a lower resolution stream, an advertisement supported stream, a censored stream, etc.) from a STB, OTA box, or content source 120. Media device 106 may perform ACR using processing module 204.

ACR is a technology for identifying content played on a media device (e.g., media device 106) or present within a media file. ACR may involve generating a unique fingerprint from the content itself. The generated fingerprint may then be used to lookup the same or equivalent content having the same fingerprint. Fingerprinting may be agnostic to content format, codec, bit rate, and or compression techniques. This makes it possible to employ it across varying networks and channels. ACR may be implemented using various other techniques as would be appreciated by a person of ordinary skill in the art.

Media device 106 may perform ACR on the lower quality media stream thereby determining or identifying a content item (e.g., a movie, sitcom, song, etc.) in the lower quality media stream having a specific quality level (e.g., SD content, advertisement supported, censored, etc.). For example, media device 106 may perform ACR on the lower quality media stream thereby generating a fingerprint for the content item. Media device 106 may then transmit the generated fingerprint to system server 126 or a content source 120, which determines if the same content item is available at a higher quality level.

Media device 106's performance of ACR on the lower quality media stream may also identify a time point where the content item occurs in the lower quality media stream. Media device 106's performance of ACR on the lower quality media stream may also determine the specific quality level of the content item. Media device 106 may also determine the specific quality level of the content item based on the source of the lower quality media stream (e.g., an OTA broadcast, a content source 120, etc.) or metadata in the lower quality media stream.

After identifying the content item, media device 106 may determine if the same content item having a higher quality level is available from another content source (e.g., a content source 120). For example, media device 106 may determine that the same content item (e.g., an episode of a popular TV show) having a higher quality level is available at a content source 120.

Media device 106 may determine whether the content item is available in a higher quality level based on various characteristics. For example, media device 106 may determine the content item is available at a higher quality level at a content source 120 because it is higher resolution (e.g., HD content or UHD content). Media device 106 may determine the content item is available at a higher quality level at a content source 120 because it offers surround sound. Media device 106 may determine the content item is available at a higher quality level at a content source 120 because it is advertisement free. Media device 106 may determine the content item is available at a higher quality level at a content source 120 because it is uncensored. Media device 106 may determine the content item is available at a higher quality level at a content source 120 because it is in another language. Media device 106 may determine the content item is available at a higher quality level at a content source 120 because it does not facilitate user tracking. Media device 106 may determine the content item is available at a higher quality level at a content source 120 because it is free of charge. Media device 106 may determine the content item is available at a higher quality level at a content source 120 because of various other characteristics as would be appreciated by a person of ordinary skill in the art.

To determine that the content item is available at a higher quality level at a content source 120, media device 106 may transmit an indication of the identified content item (e.g., a fingerprint) to system server 126 or a content source 120. Media device 106 may also transmit a time point where the content item occurs in the lower quality media stream to system server 126 or the content source 120. Media device 106 may also transmit a quality of the content item to system server 126 or the content source 120. Media device 106 may transmit various other characteristics to system server 126 or the content source 120 to aid system server 126 or the content source 120 in determining whether the same content item is available at a higher quality level. For example, media device 106 may transmit whether the identified content item is censored, advertisement free, or involves user tracking.

System server 126 or a content source 120 may determine whether the same content item having a higher quality level is available based on the provided information from media device 106 (e.g., the indication of the identified content item). For example, a content source 120 may compare a fingerprint of the content item identified by media device 106 to fingerprints of potentially the same content items in metadata 124. The content source 120 may determine if there is match between the fingerprint of the content item identified by media device 106 and a fingerprint in metadata 124 corresponding to a content item in content 122. Content source 120 may further determine whether the quality characteristics of a matched content item in content 122 are higher than the quality characteristics of the content item identified by media device 106.

If the same content item having a higher quality level is available, a content source 120 may transmit an alert indicating that to media device 106. In response, media device 106 may request the same content item having the higher quality level from the content source 120. The content source 120 may also directly transmit the same content item having the higher quality level to media device 106 in response to determining the same content item having a higher quality level is available.

In response to receiving the alert or the same content item having a higher quality level from the content source 120, media device 106 may determine when to switch to the same content item having the higher quality level. For example, media device 106 may provide a prompt to a user 132 that the same content item having a higher quality level is available and may be switched to. In response to receiving a switch confirmation from the user 132 (e.g., via remote control 110), media device 106 may then switch to outputting the same content item having the higher quality level.

Media device 106 may also automatically switch to outputting the same content item having a higher quality level at a logical endpoint in the lower quality media stream.

For example, media device 106 may automatically switch to outputting the same content item having a higher quality level at the end of an advertisement in the lower quality media stream.

Media device 106 may also automatically switch to outputting the same content item having a higher quality level immediately. In other words, media device 106 may automatically switch to outputting the same content item having a higher quality level as soon as it determines the same content item having the higher quality level exists.

Regardless of when media device 106 switches to outputting the same content item having a higher quality level, media device 106 may perform the switch such that there is a seamless transition from the lower quality media stream to the higher quality media stream. For example, media device 106 may perform the switch with frame rate synchronization (e.g., a seamless transition from a lower quality frame to a higher quality frame).

To perform a seamless transition from the lower quality media stream to the higher quality media stream, media device 106 may use various techniques. Media device 106 may rely on a content source 120 to replace the lower quality media stream with the higher quality stream to media device 106. Media device 106 may rely on this technique where media device 106 is receiving the lower quality media stream directly from the content source 120, and the higher quality media stream is also available from the content source 120. In this case, media device 106 may request the higher quality stream from the content source 120 together with the time point where the identified content item occurs in the lower quality media stream. In response, the content source 120 may transmit the higher quality media stream starting at the provided time point to media device 106. Media device 106 can then immediately output the higher quality media stream starting at a frame right after the identified content item.

Media device 106 may also request the higher quality stream from a content source 120 together with the time point where the identified content item occurs in the lower quality media stream. In response, the content source 120 may transmit the higher quality media stream to media device 106. Media device 106 may buffer a fixed amount of content of the higher quality media stream (e.g., in storage/buffer 208). This case may occur where the lower quality media stream and the higher quality media stream are coming from two difference sources (e.g., an OTA stream and a stream from the content source 120).

Media device 106 may select the amount of content to buffer based on network conditions (e.g., bandwidth, latency, packet drop rate, etc.) between media device 106 and the content source 120. Media device 106 may also select the amount of content to buffer based on processing capabilities (e.g., storage capability, CPU capabilities, memory size, etc.) of media device 106. Media device 106 may also select the amount of content to buffer based on when in the future media device 106 plans to switch to the higher quality media stream (e.g., after an advertisement 2 minutes in the future).

Once media device 106 has buffered a sufficient amount of content, media device 106 may switch to the higher quality media stream. For example, media device 106 may switch at a given time point from a lower quality frame of the identified content item in the lower quality media stream to the immediate next frame of higher quality of the same content item in the higher quality media stream. Media device 106 may select the time point to switch such that it optimizes the viewing or listening experience for the user 132. For example, media device 106 may switch at a time point where it can ensure that it has a sufficient amount of higher quality content in storage/buffer 208 to prevent interruptions in the viewing or listening experience because of network conditions or processing conditions on media device 106. Media device 106 may also switch at a time point that is logical transition point in the viewing or listening experience. For example, media device 106 may switch to the higher quality stream at the time point where an advertisement in the lower quality media stream has ended.

In addition to determining when to switch to the higher quality stream, media device 106 may utilize various techniques to figure out when to determine if there is a higher quality media stream. In other words, media device 106 may utilize various techniques to figure out when to perform ACR on the lower quality media stream.

Media device 106 may continuously perform ACR on the lower quality media stream. Media device 106 may then continuously transmit an indication of the identified content item (e.g., a fingerprint) to system server 126 or various content sources 120. Media device 106 may also transmit a time point where the identified content items occur in the lower quality media stream to system server 126 or the various content sources 120.

Media device 106 may also perform ACR on the lower quality media stream after a particular event. For example, media device 106 may perform ACR on the lower quality media stream after a user 132 changes the channel. Media device 106 may also perform ACR on the lower quality media stream after a user 132 changes a program (e.g., launches a new TV episode). Media device 106 may also perform ACR on the lower quality media stream after media device 106 concludes outputting an advertisement.

Media device 106 may also perform ACR on the lower quality media stream after receiving a content update notification from a content source 120. For example, content source 120 may transmit a push notification to media device 106 after the upload of new content (e.g., content 122) to the content source 120. The push notification may indicate that a higher quality version of content is available at the content source 120. In response to receiving the content update notification, media device 106 may perform ACR on the lower quality media stream as part of the process to determine if the identified content item in the lower quality media stream is now available in the content source 120 in a higher quality format.

Figure 3:
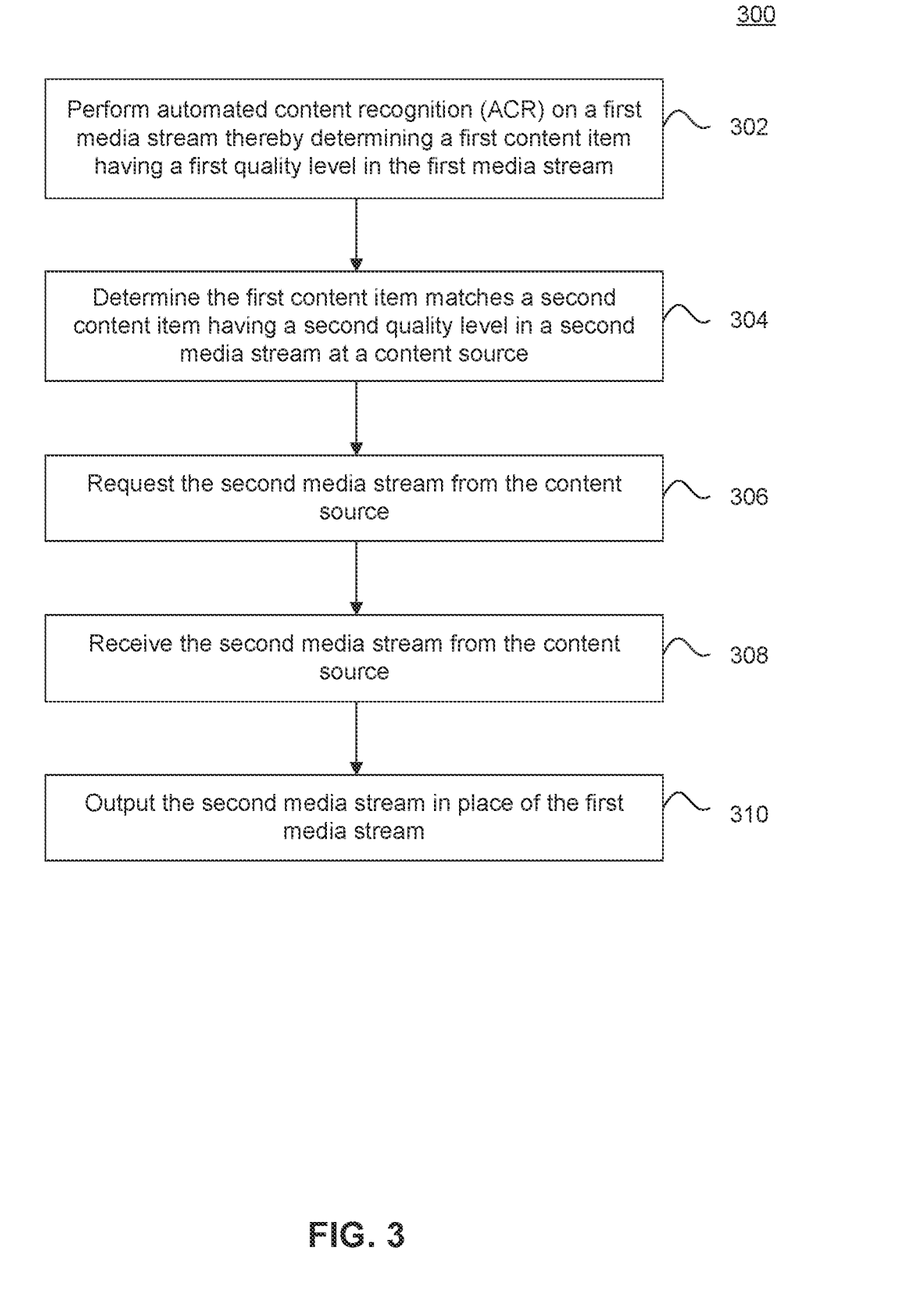
FIG. 3 is a flowchart illustrating a process for automatically offering and switching to a higher quality media stream, according to some embodiments.

FIG. 3 illustrates a method 300 for automatically offering and switching to a higher quality media stream, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

For illustrative and non-limiting purposes, method 300 shall be described with reference to FIGS. 1 and 2. However, method 300 is not limited to those examples.

In 302, media device 106 performs ACR on a first media stream thereby determining a first content item in the first media stream. The first media stream may have a low quality level (e.g., it is low resolution). For example, the first media stream may be SD content. Media device 106 may receive the first media stream from a STB or OTA box. Media device 106 may also receive the first media stream from a content source 120 via network 118.

Media device 106's performance of ACR on the first media stream may also determine a time point where the first content item occurs in the first media stream. Media device 106's performance of ACR on the first media stream may also determine a first quality level of the first content item in the first media stream. For example, media device 106's performance of ACR on the first media stream may determine that the first content item is SD content.

Media device 106 may perform ACR on the first media stream in response to outputting the first media stream (e.g., to display device 108). For example, media device 106 may perform ACR on the first media stream in response to a user 132 selecting the first media stream for playback on display device 108. Media device 106 may also perform ACR on the first media stream after a logical break occurred in the first media stream (e.g., after an advertisement). Media device 106 may also perform ACR on the first media stream in response to receiving a content update notification from a content source 120 via network 118. For example, media device 106 may receive a content update notification from a content source 120 indicating that the content source 120 has new content that might be the same as the first content item but of higher quality (e.g., a higher resolution).

In 304, media device 106 determines the first content item matches a second content item having a second quality level in a second media stream at a content source 120, where the second quality level of the second content item is higher than the first quality level of the first content item. To perform this determination, media device 106 may transmit an indication of the identified first content item (e.g., a fingerprint) to system server 126 via network 118. Media device 106 may also transmit the time point where the first content item occurs in the first media stream to system server 126 via network 118. Media device 106 may also transmit the first quality level of the first content item to system server 126 via network 118. System server 126 may then determine whether the identified first content item matches a second content item having a second quality level in a second media stream at a content source 120. System server 126 may further determine whether the second content item is higher quality than the identified first content item. If so, system server 126 may transmit an alert to media device 106 indicating a matching second content item having a second quality level in a second media stream exists at a content source 120.

Media device 106 may also transmit an indication of the identified first content item (e.g., a fingerprint) to a content source 120 via network 118. Media device 106 may also transmit the time point where the first content item occurs in the first media stream to the content source 120 via network 118. Media device 106 may also transmit the first quality level of the first content item to the content source 120 via network 118. The content source 120 may then determine whether the identified first content item matches a second content item having a second quality level in a second media stream at the content source 120. The content source 120 may further determine whether the second content item is higher quality than the identified first content item. If so, the content source 120 may transmit an alert to media device 106 indicating that a matching second content item having a second quality level in a second media stream exists at the content source 120.

In 306, media device 106 requests the second media stream from the content source 120. Media device 106 may request the second media stream from the content source 120 in response to receiving the alert indicating there is a matching second content item having a second quality level in a second media stream at the content source 120. Media device 106 may also request the second media stream based on the time point where the first content item occurs in the first media stream.

In 308, media device 106 receives the second media stream from the content source 120. To perform a seamless transition from the lower quality first media stream to the higher quality second media stream, media device 106 may rely on the content source 120 to seamless replace the lower quality media stream with the higher quality stream. For example, media device 106 may immediately receive the second content item from the content source 120 beginning at the time point where the first content item occurs in the first media stream. This may occur where the first media stream and the second media stream are both available from the content source 120.

Media device 106 may also receive and store a portion of the second content item in a buffer (e.g., storage/buffer 208) based on the time point where the first content item occurs in the first media stream. For example, media device 106 may receive and store a portion of the second content item in the buffer based on a network condition (e.g., bandwidth, latency, and or packet drop rate) associated with the content source 120. Media device 106 may also receive and store a portion of the second content item in the buffer based on a processing condition (e.g., storage capability, CPU capabilities, memory size, etc.) associated with media device 106. Media device 106 may also select the amount of content to buffer based on when in the future media device 106 plans to switch to the higher quality media stream (e.g., after an advertisement 2 minutes in the future).

In 310, media device 106 outputs the second media stream in place of the first media stream. Media device 106 may output the second media stream in place of the first media stream to display device 108. Media device 106 may also output the second media stream in place of the first media stream to a speaker. Media device 106 may also output the second media stream in place of the first media stream to another output device.

In the case where media device 106 immediately receives the second content item from the content source 120 beginning at the time point where the first content item occurs in the first media stream, media device 106 may output the second content item from the content source 120 beginning at the time point where the first content item occurs in the first media stream.

In the case where media device 106 buffers the second content item, media device 106 may output the second content item either immediately or at some time in the future. Media device 106 may output the second media stream in place of the first media stream at a logical transition point in the viewing or listening experience. For example, media device 106 may output the second media stream in place of the first media stream after an advertisement occurred in the first media stream. Media device 106 may also output the second media stream in place of the first media stream in response to receiving a user confirmation (e.g., a switch confirmation from user 132 via remote control 110).

Regardless of when media device 106 outputs the second content item, media device 106 may seamlessly transition from the lower quality first content item to the higher quality second content item. For example, media device 106 may seamlessly transition from the lower quality first content item to the higher quality second content item where the content source 120 switches to transmitting the second content item to media device 106 beginning at the time point where the first content item occurs in the first media stream. Media device 106 may seamlessly transition from the lower quality first content item to the higher quality second content item using the buffered content of the second content item. Media device 106 may use the buffered content to synchronize the transition from a lower quality frame of the first content item at a given time point (e.g., the time point where the first content item occurs in the first media stream or a logical break point in the first media stream) to a higher quality frame of the second content item immediately after the given time point.

Example Computer System

Figure 4:
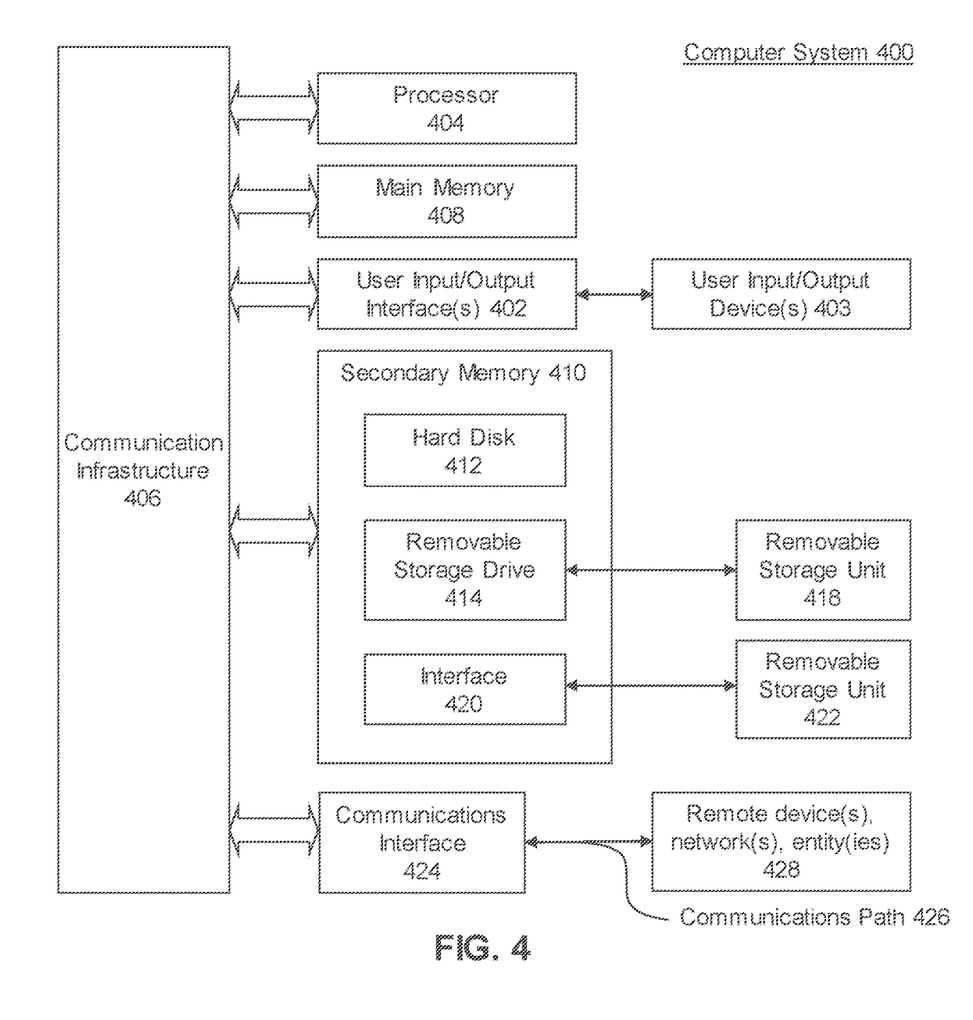
FIG. 4 illustrates an example computer system useful for implementing various embodiments.

Various embodiments may be implemented, for example, using one or more well-known computer systems, such as computer system 400 shown in FIG. 4. For example, the media device 106 may be implemented using combinations or sub-combinations of computer system 400. Also or alternatively, one or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400 or processor(s) 404), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for outputting to a higher quality media stream in place of a lower quality media stream, comprising:
   performing automated content recognition (ACR) on a first media stream from a first content source, thereby identifying a first content item having a first quality level in the first media stream and a time point where the first content item occurs in the first media stream;
   transmitting, to a system server, an indication that the first content item occurs in the first media stream, the first quality level of the first content item, and the time point where the first content item occurs in the first media stream;
   receiving, from the system server, an alert that the first content item matches a second content item having a second quality level in a second media stream from a second content source, wherein the second content source is different from the first content source, and the second quality level is higher than the first quality level;
   requesting the second media stream from the second content source based on the time point where the first content item occurs in the first media stream;
   receiving the second media stream from the second content source; and
   outputting the second media stream in place of the first media stream.

2. The computer implemented method of claim 1, wherein the receiving the second media stream further comprises:
   receiving the second content item from the second content source beginning at the time point where the first content item occurs in the first media stream.

3. The computer implemented method of claim 1, wherein the receiving the second media stream further comprises:
   storing a portion of the second content item in a buffer based on the time point where the first content item occurs in the first media stream and a network condition associated with the second content source; and
   wherein the outputting the second media stream further comprises:
   outputting the second content item from the buffer.

4. The computer implemented method of claim 1, wherein the outputting the second media stream further comprises:
   outputting the second media stream in place of the first media stream after an advertisement occurred in the first media stream.

5. The computer implemented method of claim 1, wherein the outputting the second media stream further comprises:
   outputting the second media stream in place of the first media stream in response to receiving a user confirmation.

6. The computer implemented method of claim 1, wherein the performing the ACR on the first media stream further comprises:
   performing the ACR on the first media stream in response to outputting the first media stream or after an advertisement occurred in the first media stream.

7. The computer implemented method of claim 1, wherein the performing the ACR on the first media stream further comprises:
   performing the ACR on the first media stream in response to receiving a content update notification from the content source.

8. A system, comprising:
at least one processor configured to:
perform automated content recognition (ACR) on a first media stream from a first content source, thereby identifying a first content item having a first quality level in the first media stream and a time point where the first content item occurs in the first media stream;
transmit, to a system server, an indication that the first content item occurs in the first media stream, the first quality level of the first content item, and the time point where the first content item occurs in the first media stream;
receive, from the system server, an alert that the first content item matches a second content item having a second quality level in a second media stream from a second content source, wherein the second content source is different from the first content source, and the second quality level is higher than the first quality level;
request the second media stream from the second content source based on the time point where the first content item occurs in the first media stream;
receive the second media stream from the second content source; and
output the second media stream in place of the first media stream.

9. The system of claim 8, wherein to receive the second media stream, the at least one processor is further configured to:
receive the second content item from the second content source beginning at the time point where the first content item occurs in the first media stream.

10. The system of claim 8, wherein to receive the second media stream, the at least one processor is further configured to:
store a portion of the second content item in a buffer based on the time point where the first content item occurs in the first media stream and a network condition associated with the second content source; and
wherein to output the second media stream, the at least one processor is further configured to:
output the second content item from the buffer.

11. The system of claim 8, wherein to output the second media stream, the at least one processor is further configured to:
output the second media stream in place of the first media stream after an advertisement occurred in the first media stream.

12. The system of claim 8, wherein to output the second media stream, the at least one processor is further configured to:
output the second media stream in place of the first media stream in response to receiving a user confirmation.

13. The system of claim 8, wherein to perform the ACR on the first media stream, the at least one processor is further configured to:
perform the ACR on the first media stream in response to outputting the first media stream or after an advertisement occurred in the first media stream.

14. The system of claim 8, wherein to perform the ACR on the first media stream, the at least one processor is further configured to:
perform the ACR on the first media stream in response to receiving a content update notification from the content source.

15. A non-transitory computer-readable medium having instructions stored thereon that, when executed by at least one computing device, cause the at least one computing device to perform operations comprising:
performing automated content recognition (ACR) on a first media stream from a first content source, thereby identifying a first content item having a first quality level in the first media stream and a time point where the first content item occurs in the first media stream;
transmitting, to a system server, an indication that the first content item occurs in the first media stream, the first quality level of the first content item, and the time point where the first content item occurs in the first media stream;
receiving, from the system server, an alert that the first content item matches a second content item having a second quality level in a second media stream from a second content source, wherein the second content source is different from the first content source, and the second quality level is higher than the first quality level;
requesting the second media stream from the second content source based on the time point where the first content item occurs in the first media stream;
receiving the second media stream from the second content source; and
outputting the second media stream in place of the first media stream.

16. The non-transitory computer-readable medium of claim 15, wherein the receiving the second media stream further comprises:
receiving the second content item from the second content source beginning at the time point where the first content item occurs in the first media stream.

17. The non-transitory computer-readable medium of claim 15, wherein the receiving the second media stream further comprises:
storing a portion of the second content item in a buffer based on the time point where the first content item occurs in the first media stream and a network condition associated with the second content source; and
wherein the outputting the second media stream further comprises:
outputting the second content item from the buffer.

18. The non-transitory computer-readable medium of claim 15, wherein the outputting the second media stream further comprises:
outputting the second media stream in place of the first media stream in response to receiving a user confirmation.

19. The non-transitory computer-readable medium of claim 15, wherein the performing the ACR on the first media stream further comprises:
performing the ACR on the first media stream in response to outputting the first media stream or after an advertisement occurred in the first media stream.

20. The non-transitory computer-readable medium of claim 15, wherein the performing the ACR on the first media stream further comprises:
performing the ACR on the first media stream in response to receiving a content update notification from the content source.

* * * * *